No. 700,249. Patented May 20, 1902.
A. M. G. SÉBILLOT.
APPARATUS FOR MAKING SULFURIC ACID.
(Application filed Dec. 20, 1900.)
(No Model.)

Witnesses:
T. W. McMahon.
E. Hoffman.

Inventor,
Amédée Mathurin Gabriel Sébillot
by B. Singer
Atty.

United States Patent Office.

AMÉDÉE MATHURIN GABRIEL SÉBILLOT, OF PARIS, FRANCE.

APPARATUS FOR MAKING SULFURIC ACID.

SPECIFICATION forming part of Letters Patent No. 700,249, dated May 20, 1902.

Application filed December 20, 1900. Serial No. 40,523. (No model.)

*To all whom it may concern:*

Be it known that I, AMÉDÉE MATHURIN GABRIEL SÉBILLOT, a citizen of the Republic of France, and a resident of Paris, France, have invented certain new and useful Improvements in Apparatus for the Manufacture of Sulfuric Acid, of which the following is a specification.

The object of my invention is to provide apparatus in which the temperature and proportion of the gases passing through the catalytic may be regulated or preserved at the desired uniform degree and in which the sulfuric acid will be produced in a highly-concentrated state; and it consists in the construction hereinafter described and claimed.

In the accompanying drawings I have shown the preferred form of apparatus embodying my invention.

Figure 1:
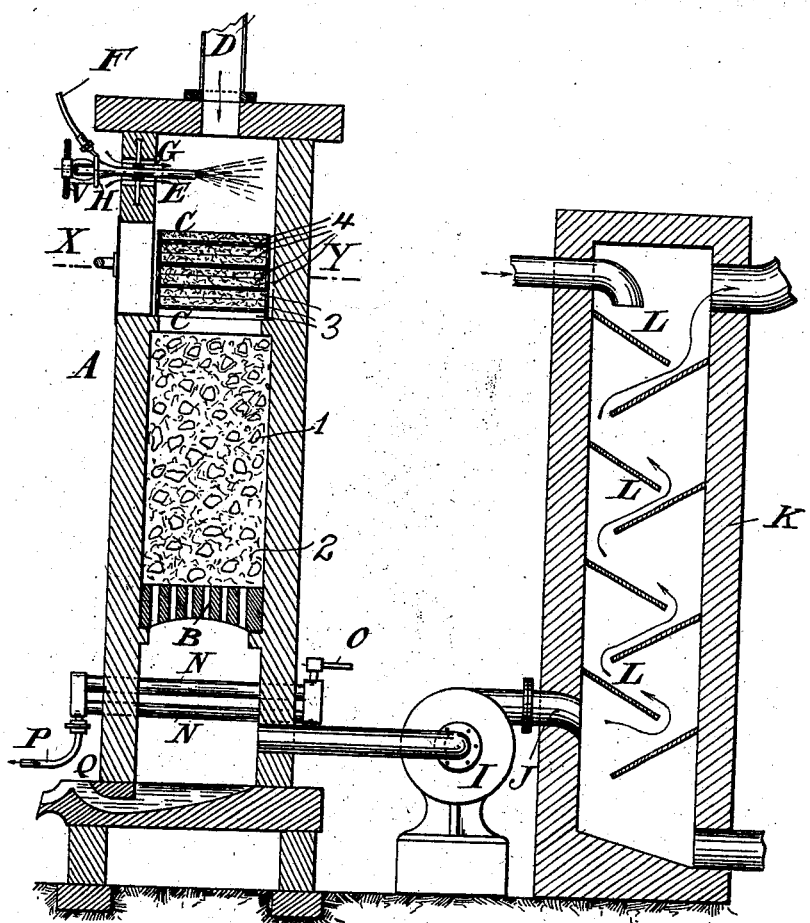
Figure 2:
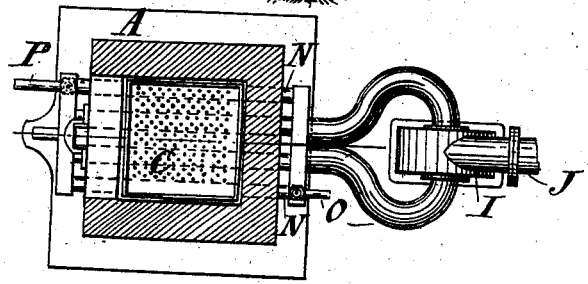

Figure 1 is a vertical section of the apparatus. Fig. 2 is a plan view of the column A with a section on line $x\,y$ of Fig. 1.

Referring to the drawings, A represents a vertical column the walls of which are formed of vitrified bricks or other suitable acid-proof material.

B indicates an inner perforated partition supporting a thick layer of pumice-stone 1, the spaces between the portions of said layer being filled with loose asbestos 2. Above said layer of pumice-stone I arrange a series of perforated plates C C C, made of white stoneware and supporting a layer of fibrous asbestos 3 and a layer of fragments of spongy platinum 4. Above these materials is left a free space forming the mixing-chamber, into which the mixture of sulfurous acid and atmospheric air is brought through a pipe D. Steam is admitted through the pipe E, and the quantity of steam is regulated by means of the cock or equivalent F. The pipe E extends through an aperture G, through which fresh air may enter the chamber in accordance with the state of the operation. In order to regulate the quantity of incoming air, the steam-pipe is made flexible and provided with a disk H, made of sufficient size to close the aperture G. Said disk may be brought to or away from said aperture by means of the screw V to regulate the quantity of air entering the apparatus. The mixture thus obtained comes first in contact with the plates supporting asbestos and spongy platinum. Then the mixture comes in contact with pumice-stone and asbestos, whereby a strong condensing action is produced. The non-condensed gases are exhausted by the ventilator I forcing them through the pipe J. As the gases arrive at the top of the apparatus at a high temperature, whereby the sulfuric acid produced would also be in a state of vapor, a cooling action must be produced for collecting liquid sulfuric acid. To this end the bottom part of the column is provided with a condenser formed of lead pipes N N, through which is passed cold water, brought thereto through the pipe O and going out through the pipe P. The condensed acid drops upon the bottom of the column, formed of Valvic stone and recessed so as to force the acid to flow through the channel Q.

When sulfuric acid is produced by means of sulfur contained in ores, with the extraction of metal in view, the pipe J leads the non-condensed gases to the bottom of a column K, the walls of which may be formed of vitrified bricks or of sheet-lead. Said column contains inclined plates L L L, over which is passed from the top a mixture of ore and water. Sulfurous acid combines with metallic oxids to produce sulfates by the action of atmospheric air. From the lowermost incline the mixture flows into a tank, (not shown,) where sulfuric acid is added in accordance with the quantity of oxid which has not been converted. The surplus of gas passes through a chimney, or it is forced into a lead chamber in order to utilize the entire amount of sulfurous acid.

Having fully described my invention, what I claim, and desire to secure by Letters Patent, is—

An apparatus for manufacturing concentrated sulfuric acid, comprising a vertically-arranged casing formed of suitable bricks, a perforated partition at the bottom part and within said casing, a thick layer of pumice-stone and asbestos supported on said partition, a series of perforated plates, at the top part and, within the casing, layers of spongy platinum on said perforated plates, a mixing-chamber above the latter, a pipe connected to said chamber for the introduction of sulfurous acid thereto, a steam-pipe discharging steam into the chamber, an air-admission aperture through which said steam-pipe extends, means for regulating the quantity of steam admitted into the chamber, means for regulating the quantity of incoming air, and means for forcing the mixed gases from said chamber through the various layers contained in the casing, substantially as and for the purpose set forth.

In testimony whereof I have hereunto set my hand in presence of two witnesses.

AMÉDÉE MATHURIN GABRIEL SÉBILLOT.

Witnesses:
ADOLPH STURM,
EDWARD P. MACLEAN.